Nov. 24, 1959  V. L. MOORE  2,914,169
CHEMICALLY RESISTANT CONTAINERS
Filed April 15, 1957
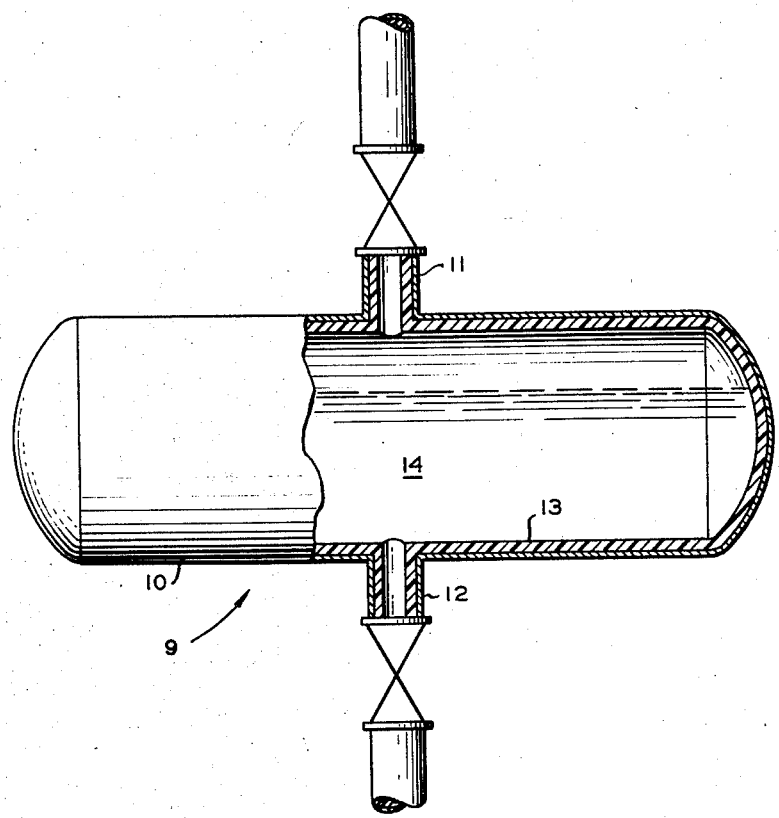
INVENTOR.
V. L. MOORE
BY Hudson and Young
ATTORNEYS

United States Patent Office 2,914,169
Patented Nov. 24, 1959

2,914,169

CHEMICALLY RESISTANT CONTAINERS

Vernon L. Moore, Bartlesville, Okla., assignor to Phillips Petroleum Company, a corporation of Delaware Application April 15, 1957, Serial No. 653,035

8 Claims. (Cl. 206—84)

This invention relates to improved chemically resistant, lined containers or tanks. In one aspect, the invention relates to containers particularly adapted for the storage of fuels, especially rocket fuels containing amines. In another aspect, it relates to a method for producing a container which is especially suitable for the storage of fuels.

Containers or tanks formed of metal or glass often prove to be unsuitable for storing and handling many fluids because such materials sometimes have a tendency to attack the metal or glass. The literature describes the use of polyethylene as a lining material to protect containers against attack from stored materials. However, it has been found that conventional polyethylene, e.g., polyethylene produced by the usual high pressure methods, is not in all cases a suitable lining material, particularly when the containers are to be used for the storage of certain fuels. For example, conventional polyethylene when used as a lining material has been found to be subject to swelling and a weight gain when in contact with fuels containing amines.

It is an object of this invention, therefore, to provide a novel, chemically resistant, lined container which is not subject to the disadvantages of conventional containers.

Another object of this invention is to provide a tank or container which is particularly suited for the storage of rocket fuels, particularly fuels containing amines.

Another object of the invention is to provide a method for producing a chemically resistant, lined container which is particularly adapted for the storage of fuels.

Other and further objects and advantages of the invention will become apparent to those skilled in the art upon consideration of the accompanying disclosure.

It has now been discovered that an improved tank or container for the storage and handling of fluids is produced if certain novel polymers of ethylene, having properties and prepared as described hereinafter, are used to line the interior of the storage vessel. The novel ethylene polymers used as a lining material in accordance with this invention have a crystallinity of at least 70 percent, preferably at least 80 percent, and more desirably at least 90 percent, at 25° C. The crystallinity is determined preferably by measurements of nuclear magnetic resonance (Wilson and Pake, Journal of Polymer Science 10, 503 (1953)), using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by a fall of about 1.5° C. per minute at 135° C. The crystallinity can also be determined according to the method of Matthews, Peiser and Richards, Acta Crystallographica 2, 85 (1949), using a polymer sample treated according to the foregoing procedure. The ethylene polymers used have a density of at least 0.94, preferably at least 0.95, at 25° C. The softening point of the polymer will vary with the particular polymer used, increasing as the density and the crystallinity of the polymer increases. Generally, the softening point is above about 250° F., preferably in the approximate range of 250 to 300° F., and is several degrees, e.g., about 10° F., higher than the melting point of the polymer. The polymers often have an inherent viscosity of at least 0.8, preferably an inherent viscosity between about 1.2 and about 10, as determined for a solution of 0.2 gram of polymer in 50 cc. of tetralin at 130° C.

Polymers of ethylene having the above-described properties are preferably produced in the method described in the copending U.S. Patent application of J. P. Hogan and R. L. Banks, Serial No. 573,877, filed March 26, 1956, now U.S. Patent 2,825,721 (1958). Thus, solid ethylene polymers suitable for use in this invention can be obtained by contacting ethylene with a catalyst comprising, as an essential ingredient, chromium oxide, preferably including a substantial amount of hexavalent chromium, as described in the aforementioned application. The chromium oxide is ordinarily associated with at least one other oxide, particularly at least one oxide selected from the group consisting of silica, alumina, zirconia, and thoria. The temperature for the polymerization reaction is usually in the range of about 100 to 500° F., with a temperature in the range of 150 to 375° F. being often preferred for the polymerization of ethylene. The polymerization is frequently conducted with the ethylene in admixture with a hydrocarbon which can be maintained in the liquid phase and is inert under the polymerization conditions. Suitable hydrocarbons are paraffins or cycloparaffins, for example, normal heptane, 2,2,4-trimethylpentane, cyclohexane and methylcyclohexane. A continuous slurry-type reaction technique is frequently preferred, the catalyst then being in powdered form, for example 40 to 100 mesh, and suspended in the hydrocarbon solvent. A pressure sufficient to maintain the solvent in the liquid phase is preferably employed, for example 200 to 700 p.s.i. When employing a suspended catalyst, a preferred polymerization temperature range is 200 to 325° F.

While it is preferred to employ solid polymers produced in accordance with the method of Hogan and Banks as described hereinabove, it is within the scope of the invention to employ polymers of ethylene produced by other methods so long as the polymers have the properties of density and crystallinity as discussed above. For example, suitable ethylene polymers for use in the practice of this invention can be produced by contacting ethylene with a catalyst comprising a mixture of an organometallic compound, such as a trialkylaluminum, for example, triethylaluminum or triisobutylaluminum, and halides of metals of group IV of the periodic system, such as titanium or zirconium tetrachloride. Suitable solid polymers of ethylene can be produced by contacting ethylene with a catalyst comprising an organometallic halide, such as diethylaluminum chloride and/or ethylaluminum dichloride, and a group IV metal halide such as titanium or zirconium tetrachloride.

A more complete understanding of the invention may be obtained by referring to the following description and the drawing which is an elevational view, partly in section, illustrating a chemically resistant, lined container in accordance with the instant invention. While the instant invention is described with relation to lined, metal containers, it is to be understood that vessels or tanks constructed of other materials, e.g., concrete, wood, or glass, can be lined with the high density, crystalline polymer described herein so as to provide improved, chemically resistant containers.

Referring now to the drawing, there is illustrated a container 9 comprising a closed shell 10 and a liquid fuel 14 containing an amine. The shell, conveniently constructed of a metal, such as steel or aluminum, is provided with an inlet conduit 11 and an outlet conduit 12, both of these conduits being furnished with suitable flow control means as shown. The interior of the shell and the inlet and outlet conduits are provided with a lining 13 of a polymer of ethylene having the properties described hereinbefore and preferably prepared in accordance with the above-described Hogan and Banks process. In some cases, it may be desirable to line both the interior and exterior of a vessel with the polymer. This is particularly desirable when the exterior surfaces come in contact with the material to be stored or with other material which might attack those surfaces. Since the polymer can be applied to the interior of the shell by several conventional processes described in the literature, it is not intended to limit the invention to any particular method of application. One suitable method for applying the polymer lining is by a flame-spraying process in which the ethylene polymer in the form of a powder is sprayed through a flame to form a continuous coating on the inner surface of the container. Another suitable process is that of whirl- or cyclone-sintering, which consists essentially of dipping the preheated container into a fluidized bed of finely divided polymer. This fluidized bed is generally obtained by forcing a gas under pressure through the porous bottom of a vessel holding the polymer powder. In the case of large tanks which do not adapt themselves to either of the foregoing methods, liners can be fabricated from sheets of the polymer and mechanically fastened to the tanks with studs or rivets. The thickness of the lining can be varied as desired; however, a lining from $\frac{1}{32}''$ to $\frac{1}{8}''$ thick is generally suitable although greater and smaller thicknesses can be used. As well as protecting the metal surfaces of the container, the lining imparts added strength to the container because of the superior physical properties of the polymer used as the lining material.

Since the ethylene polymers produced by the above-described Hogan and Banks process are affected to a greater or lesser extent by the action of oxygen when exposed thereto in the presence of light and/or heat, a suitable antioxidant is generally added to the polymer prior to its use as described herein. While it is not intended to limit the invention to any particular antioxidation agent, it is preferred to use an antioxidant selected from the class consisting of alkyl substituted phenols. Examples of these alkyl substituted phenols include 2,4,5-trimethylphenol; 2,6-diethyl-4-methylphenol; 2,4-dimethyl-6-tertiarybutylphenol; 2,4-dimethyl-6-tertiaryoctylphenol; 2,6-ditertiarybutyl-4-methylphenol; 2,6-ditertiaryamyl-4-hexylphenol; 2,4,6-tritertiarybutylphenol; 2,6-ditertiaryamyl-4-methylphenol, and the like.

The novel, chemically resistant container of this invention can be advantageously used in the handling and storage of fuels, such as rocket fuels, jet fuels, gasolines, kerosenes, motor oils, and the like. However, it has been found that a container lined with polyethylene as described herein is particularly suitable for the storage and handling of fuels containing amines, including primary, secondary and tertiary amines. The container of this invention is particularly applicable to the storage and handling of fuels containing tertiary diamines. Specific examples of, but not exhaustive of, primary amines are ethylamine, aniline, n-propylamine, isopropylamine, n-butylamine, 2-aminobutane, 2-aminopentane, 1,2-diaminoethane, 1,3-diaminopropane. Secondary amines include dimethylamine, diethylamine, methylethylamines, dibutylamine, dipropylamine, diisopropylamine, diallylamine, diphenylamine, dibenzylamine, di-(4-methylphenyl)-amine, and the like. Specific examples of tertiary amines include triethylamine, tri-n-propylamine, tri- ethanolamine, and the like. Specific examples of tertiary diamines to which this invention is particularly applicable include diamino-1-alkenes represented by the following structural formula

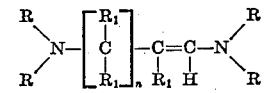

wherein each $R_1$ is a member selected from the group consisting of hydrogen, alkyl, cycloalkyl, alkenyl, cycloalkenyl, aryl, alkaryl and aralkyl radicals; each R is a member selected from the group consisting of alkyl, cycloalkyl, alkenyl, cycloalkenyl, aryl, alkaryl, and aralkyl radicals, and said R's can be alike and unlike; $n$ is an integer selected from the group consisting of 0, 1 and 2; the number of carbon atoms in $R_1$ does not exceed 18; and the total number of carbon atoms in the molecule does not exceed 30. Included among the components corresponding to the above formula are N,N,N',N'-tetramethyl-1,2-diaminoethylene, N,N,N',N'-tetramethyl-1,2-diamino-1-butene, N,N-dimethyl-N',N'-diallyl-1,2-diaminoethylene, N,N'-dimethyl-N,N'-diethyl-1,2-diaminoethylene, N,N,N',N'-tetrabutyl-1,3-diaminopropene, N,N,N',N'-tetramethyl-1,2-diamino-3,3-dimethyl-1-butene, N,N,N',N'-tetrabutyl-1,4-diamino-1-pentane, N,N,N',N'-tetraethyl-1,2-diamino-1-octadecylene, N,N,N',N'-tetramethyl-1,4-diamino-1-butene, N,N,N',N'-tetraethyl-1,2-diamino-1-propene, N,N,N',N'-tetraethyl-1,3-diamino-4,4-dimethyl-1-pentene, N,N,N',N'-tetrabutyl-1,2-diamino-5-cyclohexyl-1-pentene, N,N,N',N'-tetramethyl-1,2-diamino-7-phenyl-1-octene, N,N,N',N'-tetraethyl-1,2-diamino-3-(2-cyclohexenyl)-1-propene, N,N,N',N'-tetramethyl-1,3-diamino-2-(4-methylphenyl)-1-propene, N,N,N',N'-tetramethyl-1,3-diamino-4-hexyl-1-tetradecene, N,N,N',N'-tetraphenyl-1,2-diaminoethylene, N,N,N',N'-tetracyclohexyl-1,2-diamino-3,3-dimethyl-1-butene, N,N,N',N'-tetra-(4-methylphenyl)-1,2-diaminoethylene, N,N,N',N'-tetrabenzyl-1,2-diaminoethylene and N,N,N',N'-tetramethyl-1,2-diamino-3,7-dimethyl-1,7-octadiene.

Fuels containing other amines such as tertiary triamines, can also be stored and handled with advantage in the container of this invention. Examples of these latter compounds include N,N,N',N',N'',N''-hexamethyl-1,2,3-triaminopropane and the corresponding hexaethyl, hexapropyl, hexabutyl, hexaphenyl and hexabenzyl 1,2,3-triaminopropanes; N,N-dimethyl-N',N',N'',N''-tetraallyl-1,2,3-triaminopropane; N-methyl-N-phenyl-N',N',N'',N''-tetraethyl-1,2,3-triaminopropane; and N,N,N',N',N'',N''-hexaallyl-1,2,3-triaminopropane, and the like.

A more comprehensive understanding of the invention can be obtained by referring to the following illustrative example, which is not intended, however, to be unduly limitative of the invention.

EXAMPLE

A series of tests were carried out to show the effect of three different tertiary diamines on high density, crystalline polyethylene prepared as described herein as compared to the effect of the same materials on commercial polyethylene. The commercial polyethylene used was obtained from the Cadillac Plastic Company of Detroit, Michigan. The high density, crystalline polyethylene was prepared in accordance with the above-described Hogan and Banks process by polymerizing ethylene in the presence of a chromium oxide-silica-alumina catalyst containing about 2.5 weight percent chromium as chromium oxide. Prior to its use in the polymerization, the catalyst was activated by heating for several hours in a stream of anhydrous air at about 950° F. The polymer of ethylene so prepared had properties approximately equal to those set out hereinbelow in Table I.

Table I

| | |
|---|---|
| Softening temperature, °F.[1] | 260 |
| Density | 0.96 |
| Injection molded: | |
|    Tensile strength, p.s.i.[2] | 5100 |
|    Elongation, percent [3] | 28 |
| Compression molded: | |
|    Tensile strength, p.s.i. | 4200 |
|    Elongation, percent | 20 |
| Stiffness, p.s.i.[4] | 140,000 |
| Melt index [5] | 0.6 |
| Impact strength, Izod [6] (ft. lbs./in. notch) | 3.0 |
| Heat distortion, °F.[7] | 165 |
| Crystallinity, percent | above 92 |

[1] Adapted from method of Karrer, Davis and Dietrich, Ind. & Eng. Chem. (Anal. Ed.) 2, 96 (1930).
[2] ASTM D 638–52T.
[3] ASTM D 412–51T.
[4] ASTM D 747–50.
[5] ASTM D 1238–52T.
[6] ASTM D 256–54T.
[7] ASTM D 648–45T.

Strips of samples of commercial polyethylene and of the high density, crystalline polyethylene were placed in glass bottles containing tertiary diamines, as named in Table II hereinbelow, and stored for 90 days under nitrogen or oxygen. The results of these tests are set out in Table II.

Table II

| | Commercial Polyethylene | | High Density, Crystalline Polyethylene | |
|---|---|---|---|---|
| Fuel | Stored under N₂[1] 90 Days | Stored under Air[1] 90 Days | Stored under N₂ 90 Days | Stored under Air 90 Days |
| 1. N,N,N',N'-tetramethyl-1,3-diamino-1-propene: | | | | |
|   Sample weight, percent increase | 16.8 | 15.9 | 2.9 | 3.2 |
|   Sample size, persent increase— | | | | |
|     Thickness | 12.9 | 12.9 | None | None |
|     Width | 5.6 | 20.0 | None | None |
|     Length | 1.9 | 4.6 | None | None |
| 2. N,N,N',N'-tetramethyl-1,3-diamino-1-butene: | | | | |
|   Sample weight, percent increase | 17.4 | 18.7 | 9.6 | 4.1 |
|   Sample size, percent increase— | | | | |
|     Thickness | 16.1 | 12.9 | None | None |
|     Width | 4.4 | 4.4 | None | None |
|     Length | 5.0 | 5.0 | None | None |
| 3. N,N,N',N'-tetramethyl-1,3-diamino-butane: | | | | |
|   Sample weight, percent increase | 25.0 | 24.4 | 2.9 | 2.1 |
|   Sample Size, percent increase— | | | | |
|     Thickness | 19.3 | 19.3 | None | None |
|     Width | 11.1 | 10.3 | None | None |
|     Length | 7.6 | 6.9 | None | None |

[1] In the case of test #1 using commercial polyethylene, flocculent material was observed in the fuel. In the case of test #2 using commercial polyethylene, the fuel turned cloudy and dark, flocculent material was observed in the bottom of the glass bottles, and the polyethylene was discolored a dark yellow.

The data in Table II show that in the case of the commercial polyethylene there was considerable swelling and weight gain. On the other hand, in the case of the high density, crystalline polyethylene, no swelling and a substantially smaller weight gain were noted. Furthermore, there were no indications that the fuels attacked the high density, crystalline polyethylene as occurred in the case of the commercial polyethylene.

From the foregoing, it is seen that in accordance with this invention, a novel, chemically resistant, lined container is provided which is particularly suitable for the storage of fuels. It will be apparent that many modifications and variations of the instant invention can be made by those skilled in the art. Such variations and modifications are believed to come within the spirit and scope of the foregoing disclosure.

I claim:

1. A package comprising a container shell, a lining applied to the inner surface of said shell, said lining being formed of a solid polymer of ethylene having a density of at least 0.94 at 25° C. and a crystallinity of at least 70 percent at 25° C., and a liquid fuel containing amines in contact with said lining.

2. A chemically resistant package in accordance with claim 1 in which said polymer of ethylene has a density of at least 0.95 at 25° C., and a crystallinity of at least 90 percent at 25° C.

3. A package comprising a container shell, valved inlet and outlet conduit means attached to said shell, a lining applied to the interior surfaces of said shell and conduit means, said lining being formed of a solid polymer of ethylene having a density of at least 0.95 at 25° C. and a crystallinity of at least 90 percent at 25° C., and a liquid fuel containing amines in contact with said lining.

4. The package of claim 3 in which the fuel contains tertiary diamines.

5. The package of claim 4 in which the fuel contains N,N,N',N'-tetramethyl-1,3-diamino-1-butene.

6. The package of claim 4 in which the fuel contains N,N,N',N',-tetramethyl-1,3-diamino-1-butene.

7. The package of claim 4 in which the fuel contains N,N,N',N'-tetramethyl-1,3-diaminobutane.

8. An article of manufacture comprising a hollow metal container, a lining applied to the inner surfaces of said container, said lining being formed of a solid polymer of ethylene having a density of at least 0.94 at 25° C. and a crystallinity of at least 70 percent at 25° C., and a liquid fuel containing amines in contact with said lining.

References Cited in the file of this patent

UNITED STATES PATENTS

| | | |
|---|---|---|
| 2,496,396 | Kassel | Feb. 7, 1950 |
| 2,712,384 | Corneil | July 5, 1955 |
| 2,822,357 | Brebner et al. | Feb. 4, 1958 |
| 2,825,721 | Hogan et al. | Mar. 4, 1958 |
| 2,833,755 | Coover | May 6, 1958 |

UNITED STATES PATENT OFFICE
CERTIFICATE OF CORRECTION

Patent No. 2,914,169                                              November 24, 1959

Vernon L. Moore

It is hereby certified that error appears in the printed specification of the above numbered patent requiring correction and that the said Letters Patent should read as corrected below.

Column 6, line 23, for "-butene" read -- -propene --.

Signed and sealed this 31st day of May 1960.

(SEAL)
Attest:
KARL H. AXLINE                                              ROBERT C. WATSON
Attesting Officer                                        Commissioner of Patents